(12) United States Patent
Lin

(10) Patent No.: US 8,363,434 B2
(45) Date of Patent: Jan. 29, 2013

(54) INTERLEAVED BRIDGELESS POWER FACTOR CORRECTOR AND CONTROLLING METHOD THEREOF

(75) Inventor: Pao-Hung Lin, Zhubei (TW)

(73) Assignee: Logah Technology Corp., Hsinchu County (TW)

( * ) Notice: Subject to any disclaimer, the term of this patent is extended or adjusted under 35 U.S.C. 154(b) by 523 days.

(21) Appl. No.: 12/644,015

(22) Filed: Dec. 22, 2009

(65) Prior Publication Data

US 2011/0149622 A1    Jun. 23, 2011

(51) Int. Cl.
*H02M 1/12*     (2006.01)
*H02M 7/217*    (2006.01)
(52) U.S. Cl. .......................... 363/44; 363/127
(58) Field of Classification Search .................. 363/52, 363/53, 84, 88, 89, 125–127, 44–46; 323/222, 323/223, 225
See application file for complete search history.

(56) References Cited

U.S. PATENT DOCUMENTS

| | | | | |
|---|---|---|---|---|
| 7,215,560 | B2 * | 5/2007 | Soldano et al. | 363/44 |
| 7,355,868 | B2 * | 4/2008 | Soldano | 363/89 |
| 7,605,570 | B2 * | 10/2009 | Liu et al. | 323/207 |
| 2012/0069615 | A1 * | 3/2012 | Tomioka | 363/126 |

* cited by examiner

*Primary Examiner* — Matthew Nguyen
(74) *Attorney, Agent, or Firm* — Chun-Ming Shih

(57) ABSTRACT

In an interleaved bridgeless power factor corrector and a controlling method thereof, the interleaved bridgeless power factor corrector includes an AC input power supply, two input inductors, four active components, two passive components, an output capacitor, and an output resistor, wherein the four active components are cascaded in a full bridge form to act as control switches and rectifying switches having different phases; besides, the interleaved bridgeless power factor corrector is connected to a control signal processor and a control circuit, which can output complementary switch signals to control the interleaved bridgeless power factor corrector, thereby achieving output/input ripple cancellation and frequency multiplication.

6 Claims, 15 Drawing Sheets

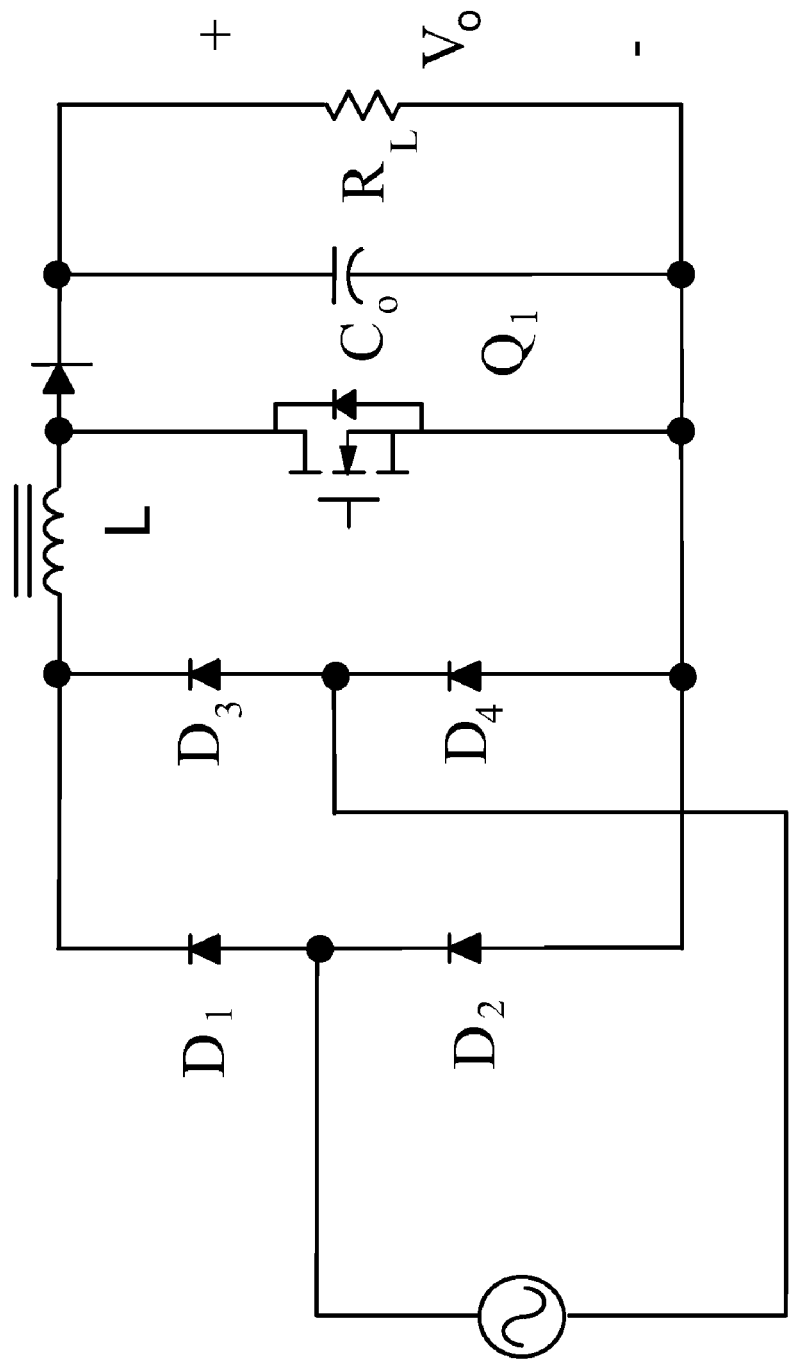
FIG.1 *(Prior art)*

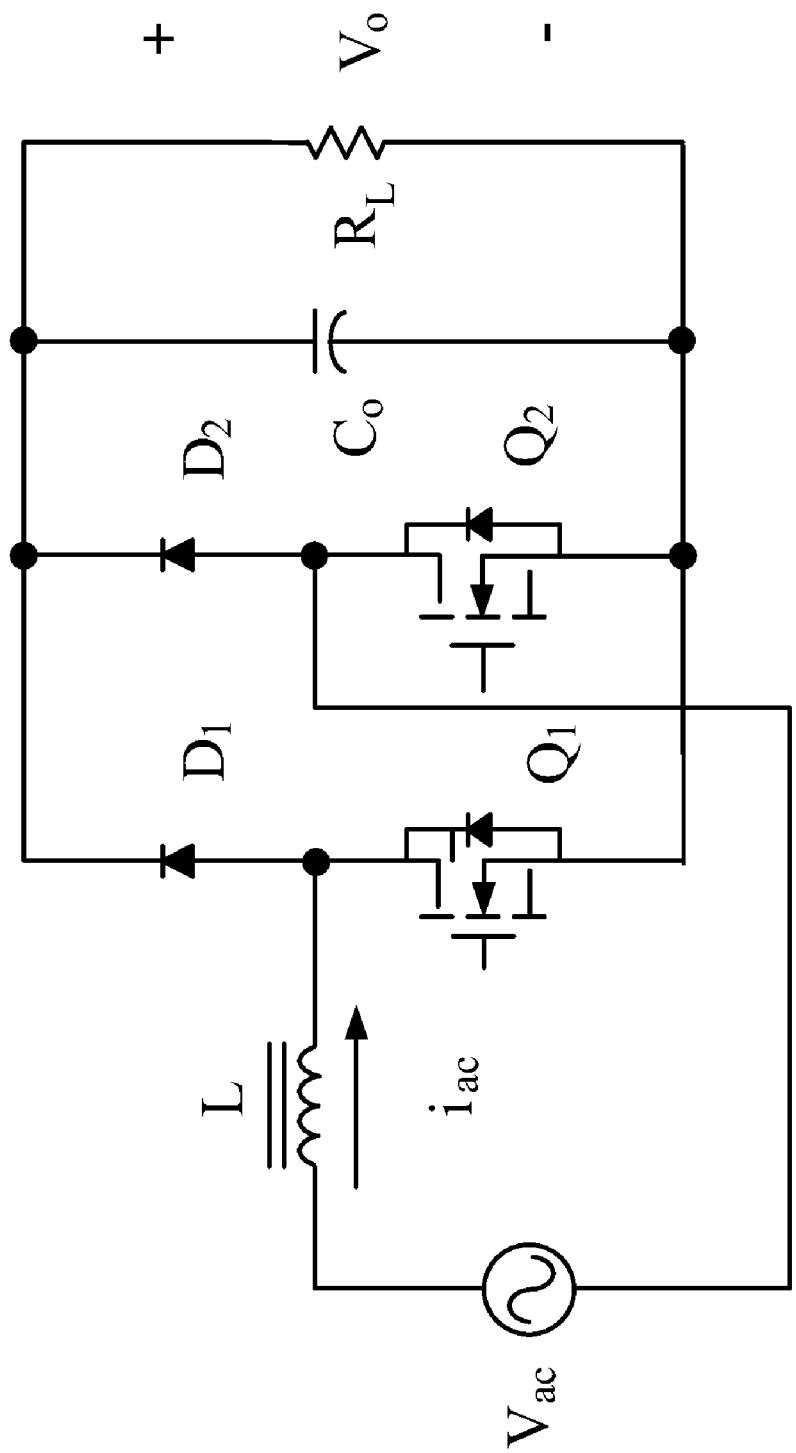
FIG.2A *(Prior art)*

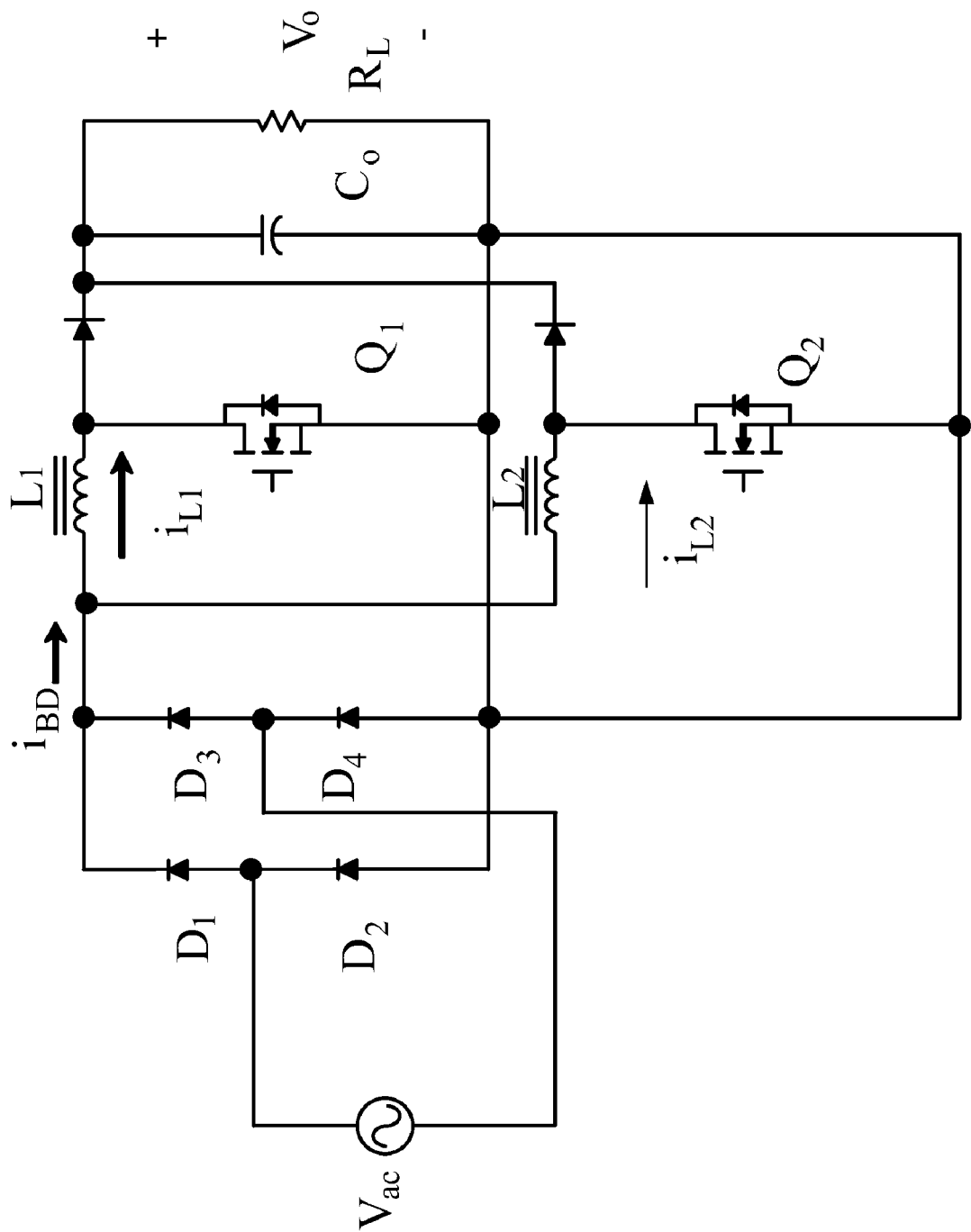
FIG.3 *(Prior art)*

INTERLEAVED BRIDGELESS POWER FACTOR CORRECTOR AND CONTROLLING METHOD THEREOF

BACKGROUND OF THE INVENTION

1. Field of the Invention

The present invention relates to an interleaved bridgeless power factor corrector and a controlling method thereof, and more particularly, to a low-loss, high-power-density power factor corrector and a controlling method thereof, which can be applied to various kinds of power supply products, especially those applications which require high power density and medium-to-high power output applications in a limited space.

2. Description of the Prior Art

A conventional AC to DC converter comprises a rectifier and a DC converter, as shown in FIG. 1, the rectifier rectifies the current by using four diodes connected in a bridge form, that is, the rectifier acts as a bridge rectifier; the DC converter is usually a boost converter to achieve high power factor and to reduce total harmonic distortion (THD). In order to meet demands of new applications and various power regulations and performance requirements, all kinds of power supply topologies and controlling method are proposed, such as a bridgeless power factor corrector (PFC) and an interleaved PFC. A bridgeless PFC eliminates the need of the bridge rectifier in the traditional power supply topology, more precisely, it uses two active switches (such as POWERMOSFET, IGBT, BJT) to replace the two low side diodes in the bridge rectifier and to form a boost converter with the cascaded inductor of the input AC power supply, as shown in FIG. 2A. Another bridgeless PFC uses two active switches to replace diodes of one branch of the bridge rectifier, as shown in FIG. 2B, the two diodes on the right branch are used for determining a flow of the current, and the two active switches and the inductor on the left branch form a boost converter to meet the requirements of high power factor and low THD and to provide feedback to the bridgeless PFC for controlling the active switches, thereby achieving the same performance as that of the traditional converter. Besides, by using active switches to replace the passive switches (diodes), the forward voltage drop loss caused by the diodes no longer exists, and only the conduction loss of the active switches remains; since the conduction loss is far less than the forward voltage drop loss in most applications, therefore the bridgeless PFC can provide better power conversion efficiency.

Another hot power supply topology is the interleaved power factor corrector, as shown in FIG. 3, as compared with the bridgeless PFC, the interleaved power factor corrector are more popular and have been applied in all kinds of high power density DC to DC converters, such as the VRM power supply for the CPU and high power communication applications. The interleaved power factor corrector are constructed by connecting more than one power supply converter in parallel and synchronizing the switching frequency of each converter with a respective phase delay, wherein the phase delay is determined by the number of converters in parallel (that is, phase delay is 360/n, n is the number of converters), the cancellation effect of the input/output current due to interleaved switching signals could reduce the current ripple as the number of converters in parallel increased and obtain frequency multiplication, which help to reduce the size of the output filter and the front end EMI filter, meanwhile, distributing the total power in n sets of converters could facilitate better heat dissipation and efficiency; based on this principle, the interleaved power factor corrector are constructed by connecting more than two sets of boost converter in parallel and using a feedback mechanism to achieve high power factor conversion.

Therefore, the bridgeless PFC and the interleaved power factor corrector can have their respective advantages and application fields, it is desirable to combine the advantages of both to provide a power factor corrector having low loss and high power density and to maximize the possible applications for the converter.

In view of the deficiencies of the prior art techniques, after years of constant researches, the inventor has successfully proposed an interleaved bridgeless power factor corrector and a controlling method thereof in the present invention.

SUMMARY OF THE INVENTION

It is an object of the present invention to provide an interleaved bridgeless power factor corrector and a controlling method thereof and to provide a novel structure combining the advantages of the bridgeless and interleaved PFC, this novel interleaved bridgeless power factor corrector can act like the bridgeless power factor corrector to reduce the power loss of passive switches and can also act like the interleaved PFC to reduce the input/output current ripple and to multiply the ripple frequency to optimize the filter design, thereby increasing the total conversion efficiency and power density.

In order to achieve the above objects, the present invention discloses an interleaved bridgeless power factor corrector and a controlling method thereof, the interleaved bridgeless power factor corrector comprises an AC input power supply, input inductors ($L_1$, $L_2$), four active component ($Q_1$~$Q_4$), two passive components ($D_1$, $D_2$), an output capacitor ($C_O$), and an output resistor ($R_L$), wherein the four active components are cascaded in a full-bridge form and are divided into a set of control switches and a set of rectifying switches, wherein the set of control switches are directly controlled by the control circuit, the AC input power supply has a first end coupled with the input inductor and a second end coupled between the first passive component and the second passive component; besides, the passive component is also connected with the set of control switches, the set of rectifying switches, the output capacitor and the output resistor in parallel, while the two passive components are used for guiding the flow of the current.

The interleaved bridgeless power factor corrector can be connected to a control signal processor and a control circuit, the control signal processor comprises an output voltage attenuator, an input voltage attenuator, an absolute value circuit, a comparator, a proportional integral circuit, and a multiplier circuit, wherein the output voltage attenuator is coupled with the interleaved bridgeless power factor corrector and the comparator for converting an high output voltage into a lower output voltage, which is further processed by the control circuit to obtain a feedback signal, this feedback signal is then compared with a precise reference voltage level (command) to obtain an voltage error of the control circuit, and then the voltage error is processed by the proportional integral circuit to obtain a control signal for the voltage circuit, then this control signal is multiplied by an attenuation value of the input power supply to obtain a reference current level (command); while the feedback of the input current is obtained by using the current sensor with an attenuation of Ki of the attenuator and a conversion of the negative half cycle by the absolute value circuit; this feedback value is compared with the reference current level to obtain an current error, which is also processed by the proportional integral circuit to obtain another control signal, this control signal determines the duty cycle of the output drive signal.

Accordingly, the control circuit will generate two sets of control switch drive signals having a phase delay of 180 degrees, which are obtained by using two sets of comparator with a triangular wave having a phase shift of 180 degrees as a pulse width modulator and passing the output control signal through this pulse width modulator; then the two sets of control switch drive signals is sent through an XOR circuit to work with a commutating signal to generate a signal, which ensures the commutation of the control switch and the rectifying switch during the negative half cycle, and finally the signal is sent through an inverter to obtain a complementary switch signal correspondingly.

BRIEF DESCRIPTION OF THE DRAWINGS

FIG. 1 illustrates a view of a prior art power factor corrector circuit;

FIG. 2A illustrates a view of a prior art bridgeless power factor corrector circuit;

FIG. 3 illustrates a view of a prior art interleaved power factor corrector circuit;

DETAILED DESCRIPTION OF THE PREFERRED EMBODIMENT

Figure 2B:
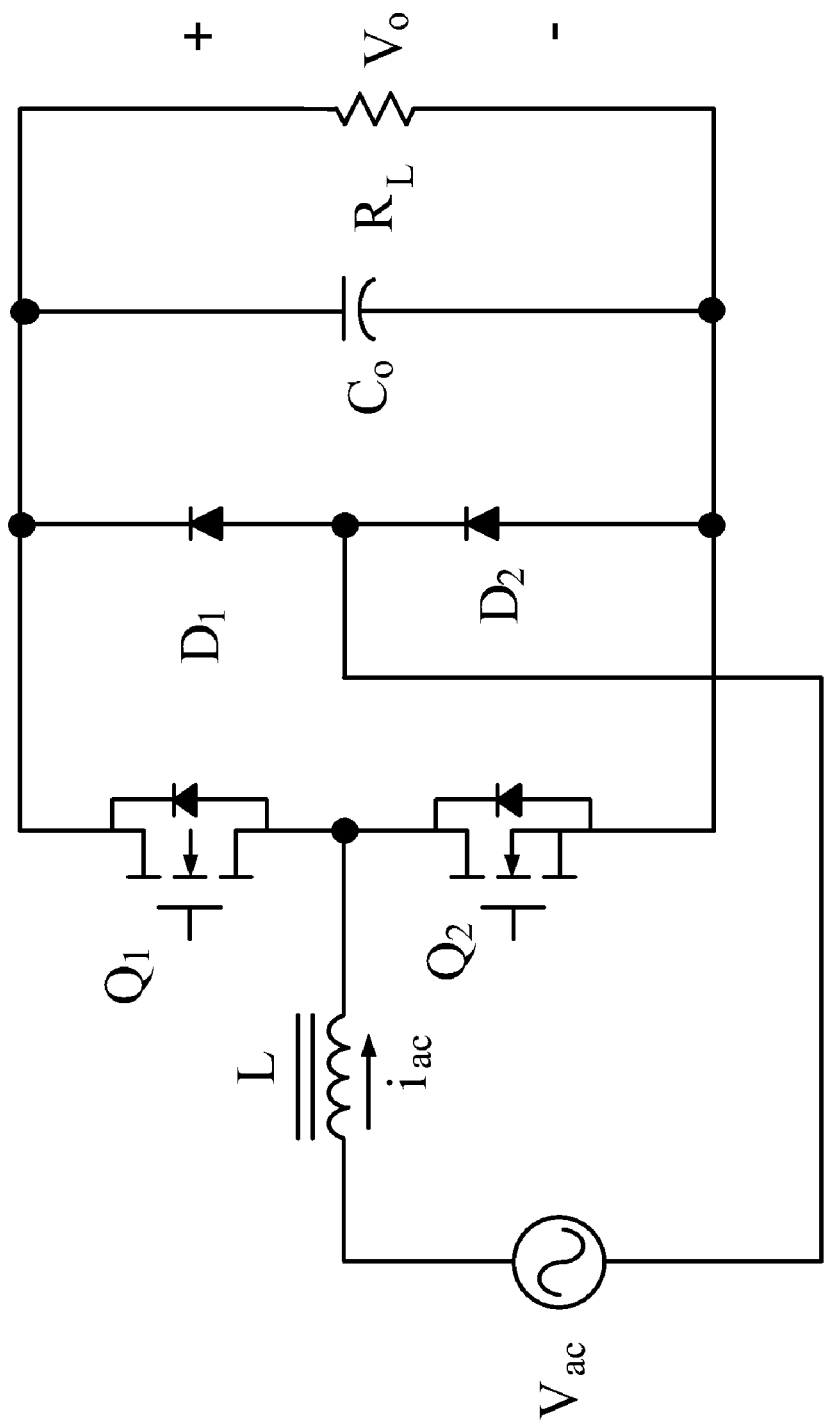
FIG. 2B illustrates a view of another prior art bridgeless power factor corrector circuit.
Figure 4:
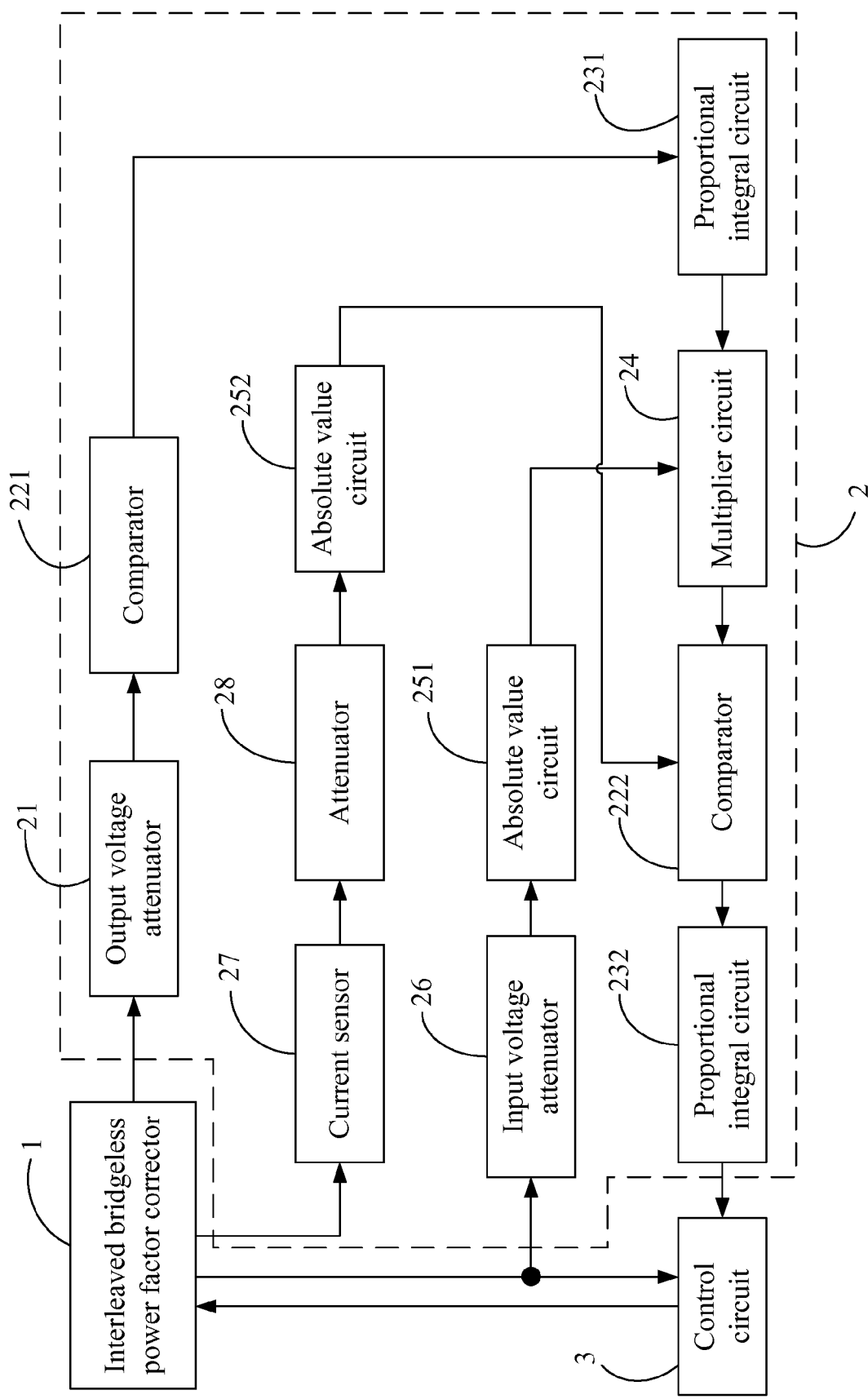
FIG. 4 illustrates a block diagram of an average current control circuit of an interleaved bridgeless power factor corrector and a controlling method in the present invention.
Figure 6:
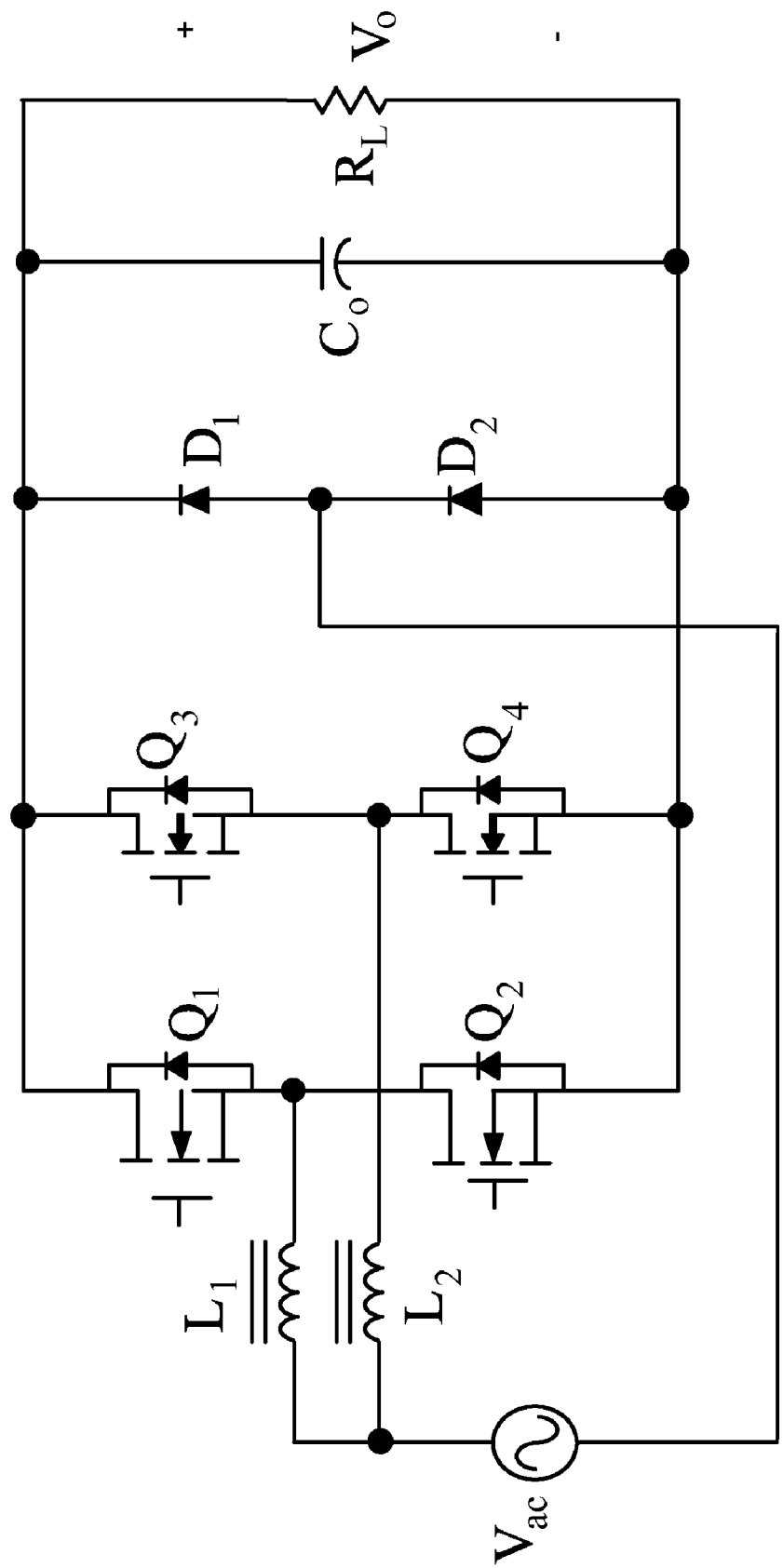
FIG. 6 illustrates an embodiment view of the interleaved bridgeless power factor corrector and the controlling method thereof in the present invention.
Figure 10:
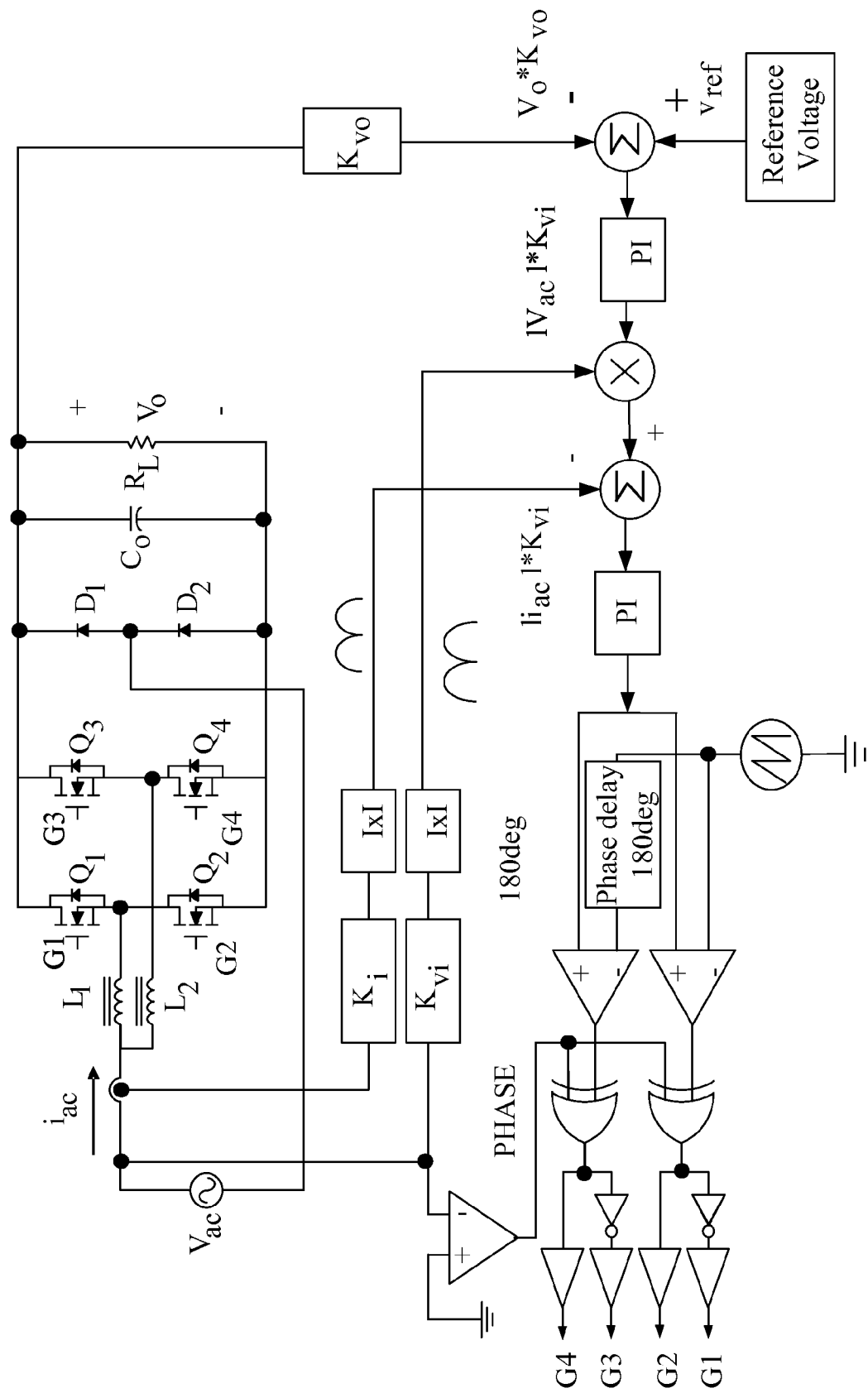
FIG. 10 illustrates an embodiment of an average current control circuit of the interleaved bridgeless power factor corrector and the controlling method thereof.
Figure 11:
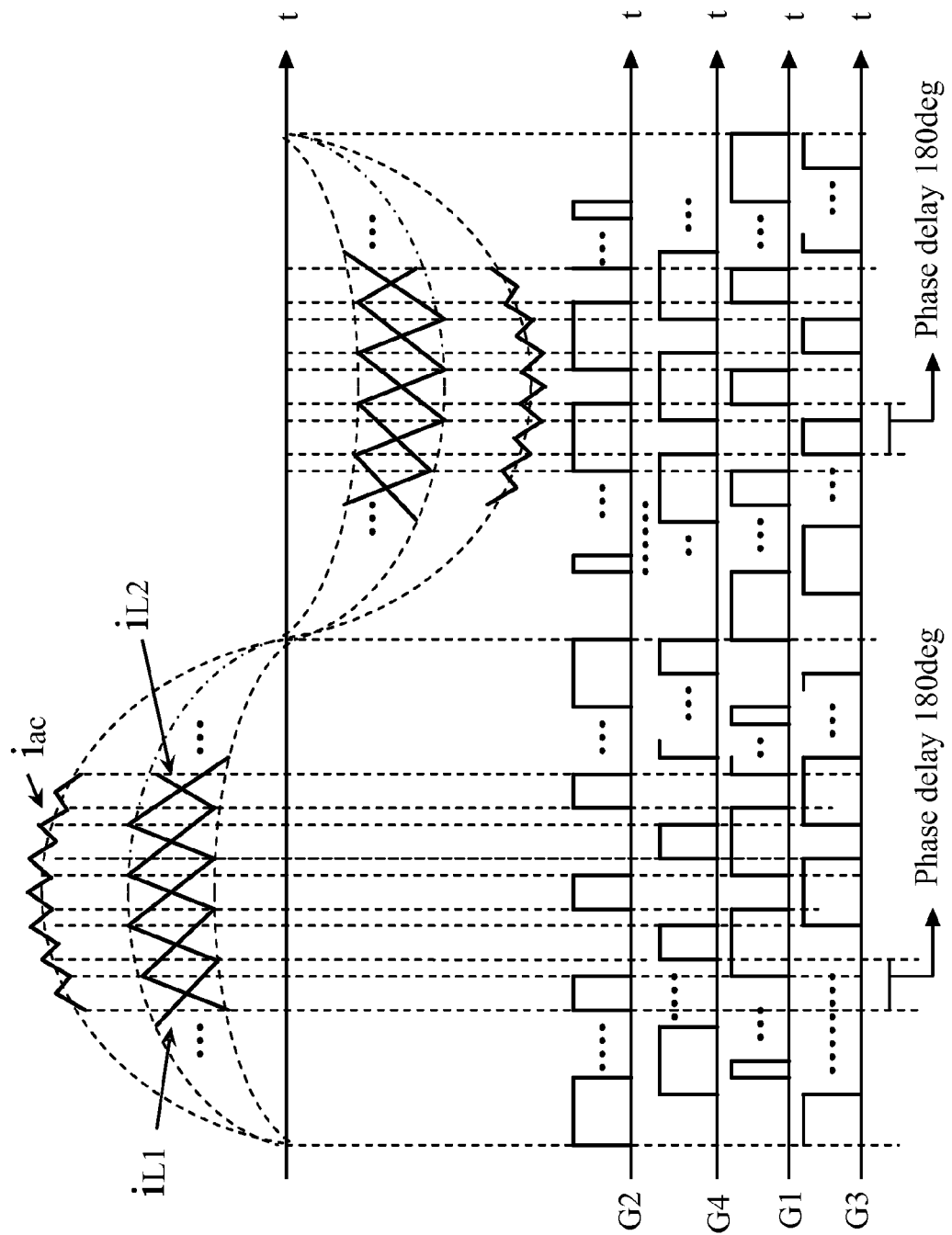
FIG. 11 illustrates the waveforms for the inductor currents iL1, iL2 and the input current iac of the interleaved bridgeless power factor corrector and the controlling method thereof

Please refer to FIG. 4 and FIG. 10 for a structural view and an embodiment view of an interleaved bridgeless power factor corrector and a controlling method thereof, as shown in the figures, the present invention comprises:

The interleaved bridgeless power factor corrector 1 is coupled with a control signal processor 2 and a control circuit 3, from FIG. 6, the interleaved bridgeless power factor corrector 1 comprises an AC input power supply, an input inductor ($L_1$, $L_2$), four active components ($Q_1$~$Q_4$), two passive components ($D_1$, $D_2$), an output capacitor ($C_O$) and an output resistor ($R_L$);

a control signal processor 2 comprises an output voltage attenuator 21, comparators 221, 222, proportional integral circuits 231,232, a multiplier circuit 24, an absolute value circuit 251,252, an input voltage attenuator 26, a current sensor 27, and an attenuator 28, wherein the input voltage attenuator 26 and the current sensor 27 are coupled with the interleaved bridgeless power factor corrector 1, the input voltage attenuator 26 and the current sensor 27 are coupled with the absolute value circuit 25 and the attenuator 28 respectively, and the output voltage attenuator 21 is coupled with the interleaved bridgeless power factor corrector 1 and the comparator 221 to convert the output high voltage into a lower DC voltage, which is further processed by the control circuit 3 to obtain a feedback signal, this feedback signal is then compared with a precise reference voltage level (command) by the comparator 221 to obtain an voltage error of the control circuit, and then the voltage error is processed by the proportional integral circuit 231 to obtain a control signal for the voltage circuit, then this control signal is multiplied by an reference value of the input power supply (by using the multiplier circuit 24) to obtain a reference current level (command), wherein the reference value of the input power supply is obtained based on the processing of the input voltage attenuator 26 and the absolute value circuit 251; while the feedback of the input current is obtained by using the current sensor 27 with an attenuation of the attenuator 28 and a conversion of the negative half cycle by the absolute value circuit 252; this feedback value is then compared with the reference current level (of the input current control circuit) by the comparator 222 to obtain an current error, which is also processed by the proportional integral circuit 232 to obtain another control signal, this control signal determines the duty cycle of the output drive signal;

a control circuit 3 is coupled with the interleaved bridgeless power factor corrector 1 and the control signal processor 2, the control circuit 3 determines two sets of control switch drive signals having a phase delay of 180 degrees, which are obtained by using two sets of comparator with a triangular wave having a phase shift of 180 degrees as a pulse width modulator and by passing the output control signal through this pulse width modulator; then the two sets of control switch drive signals are sent through an XOR circuit to work with a commutating signal to generate a signal, which ensures the commutation of the control switch and the rectifying switch during the negative half cycle, and finally the signal is sent through an inverter to obtain a complementary switch signal correspondingly (please refer to FIG. 10 for an embodiment view of the present invention); besides, FIG. 11 illustrates the waveforms for the inductor currents $i_{L1}$, $i_{L2}$ and the input current $i_{ac}$, for better illustration, the duty cycle is fixed, from the illustrated waveforms, the input current is in phase with the input voltage, thereby providing a power conversion having high power factor and low THD.

Figure 5:
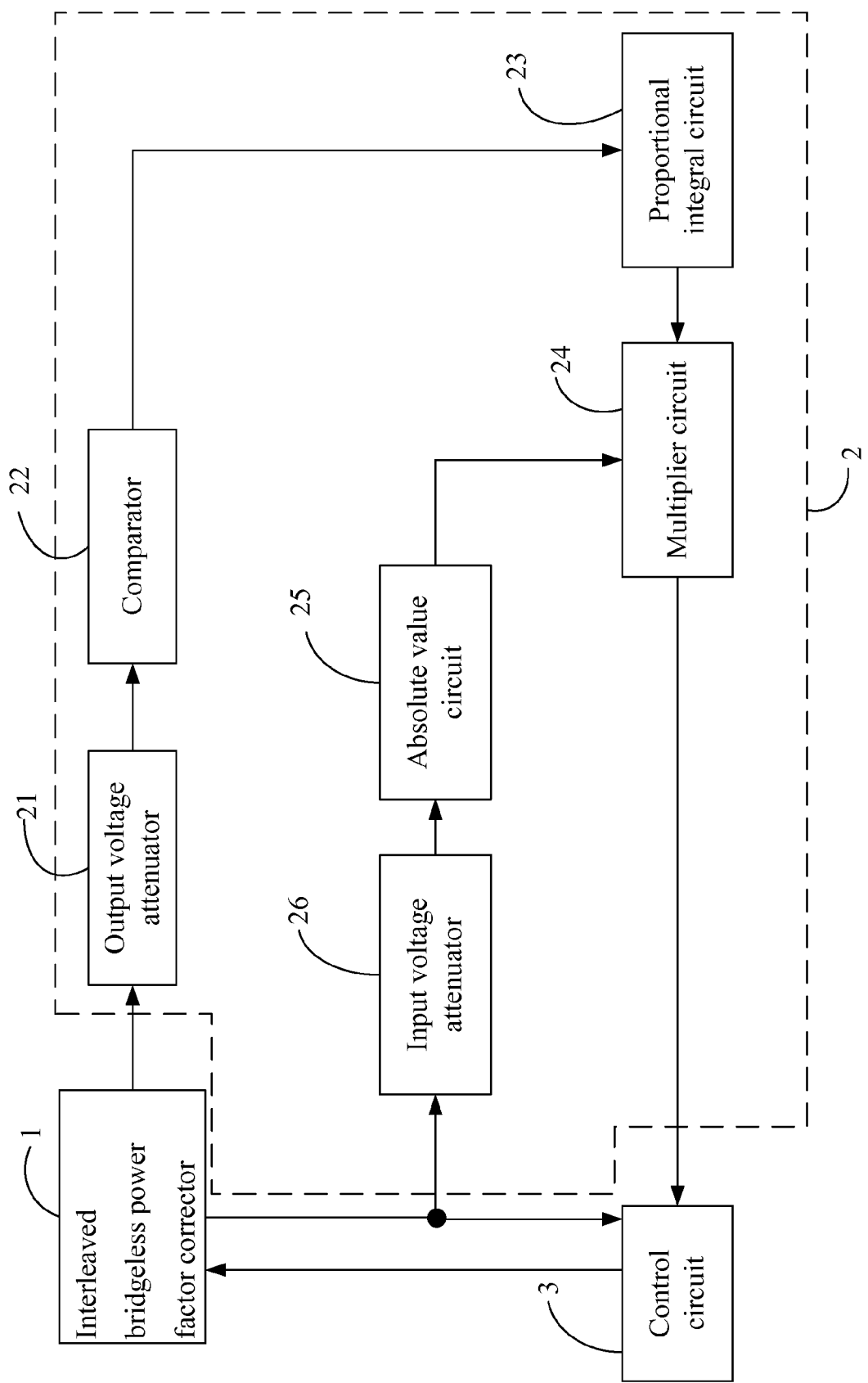
FIG. 5 illustrates a block diagram of a critical conduction control circuit of an interleaved bridgeless power factor corrector and a controlling method in the present invention.
Figure 12:
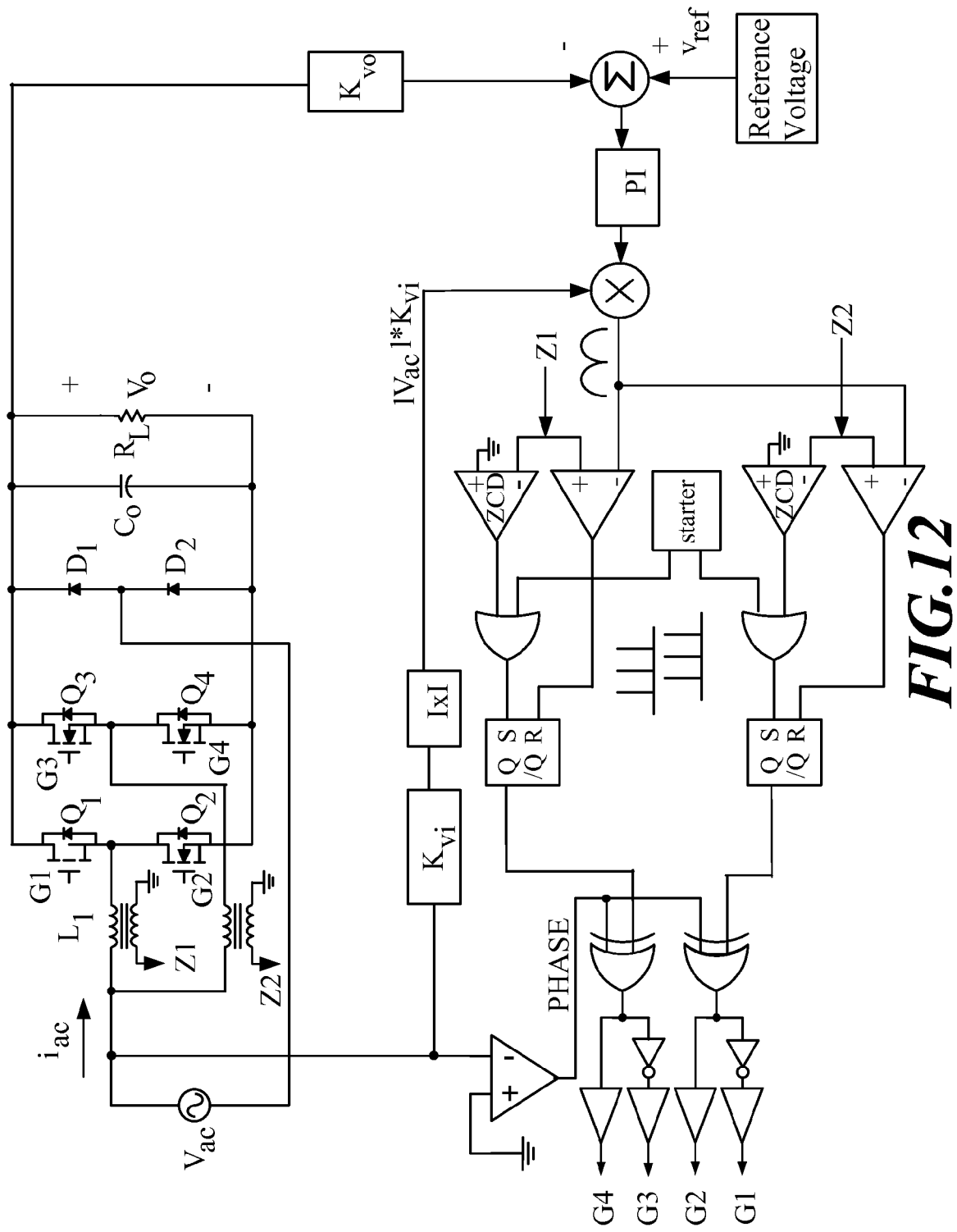
FIG. 12 illustrates an embodiment view of a critical conduction control circuit of the interleaved bridgeless power factor corrector and the controlling method thereof.

Please refer to FIG. 5 and FIG. 12 for a critical conduction control circuit structure and an embodiment view of the interleaved bridgeless power factor corrector and the controlling method thereof respectively, as shown in the figures, the present invention discloses the interleaved bridgeless power factor corrector 1, the control signal processor 2, and the control circuit 3, wherein the control signal processor 2 comprises the output voltage attenuator 21, the comparator 2, the proportional integral circuit 23, the multiplier circuit 24, the absolute value circuit 25, and the input voltage attenuator 26, the input voltage attenuator 26 is coupled with the interleaved bridgeless power factor corrector 1 and the absolute value circuit 25, the output voltage attenuator 21 is coupled with the interleaved bridgeless power factor corrector 1 and the comparator 22, therefore the output voltage is sent through the output voltage attenuator 21 for obtaining a proportional voltage feedback value, this voltage feedback value is compared with a precise reference voltage to obtain a voltage error, this voltage error is then processed by the proportional integral circuit 23 to obtain an output value of the voltage circuit, this output value is later multiplied by the input voltage attenuation value to obtain a comparative current signal (which is the reference current level of the input current control circuit and is used for determining a duty cycle of the output drive signal).

Please refer to FIG. 12, during the positive half cycle, the commutating signal is 0; when the control circuit starts operation, it outputs two sets of pulse signals having a phase delay of 180 degrees, so the outputs of the SR flip-flops will reach high voltage level one after another, $Q_2$, $Q_4$ will be turned on sequentially, and the currents flowing though the inductors will rise along with the input voltage and the elapsed time, afterwards, when the feedback signals $Z_1$, $Z_2$ through the inductors are now larger than the comparative current signal, the outputs of the corresponding SR flip-flops are reset to be zero, then $Q_2$, $Q_4$ are cut off and $Q_1$, $Q_3$ are turned on, the voltage drop across the inductors are negative, so the inductor currents start to decrease as time goes by, after that, when the inductor currents are less than zero, the output voltage level of ZCD turns high, which will trigger another commutation cycle, and the total system is controlled by repeating the above steps.

Please refer to FIG. 6 an embodiment view of the interleaved bridgeless power factor corrector, as shown in FIG. 6, the interleaved bridgeless power factor corrector comprises:

an AC input power supply having a first end coupled with the input inductor $L_1$, $L_2$, and a second end coupled between the first passive component $D_1$ and the second passive component $D_2$;

an input inductor comprising a first input inductor $L_1$ and a second input inductor $L_2$, wherein one end of the first input inductor $L_1$ is coupled between the first active component $Q_1$ and the second active component $Q_2$, and the second input inductor $L_2$ is coupled between the third active component $Q_3$ and the fourth active component $Q_4$;

an active component comprising the first active component, the second active component, the third active component, and the fourth active component, wherein the first active component, the second active component, the third active component, and the fourth active component are cascaded in a full-bridge form and are divided into a set of control switches and a set of rectifying switch having different phases, the set of control switch is directly controlled by a control circuit;

a passive component comprising the first passive component $D_1$ and the second passive component $D_2$, the first passive component $D_1$ having a cathode coupled with an anode of the second passive component $D_2$, and the mutually connected first passive component $D_1$ and second passive component $D_2$ being connected with the set of control switches, the set of rectifying switches, an output capacitor, and an output resistor in parallel, wherein the first passive component $D_1$ and the second passive component $D_2$ are provided for guiding a flow of a current.

Figure 7A:
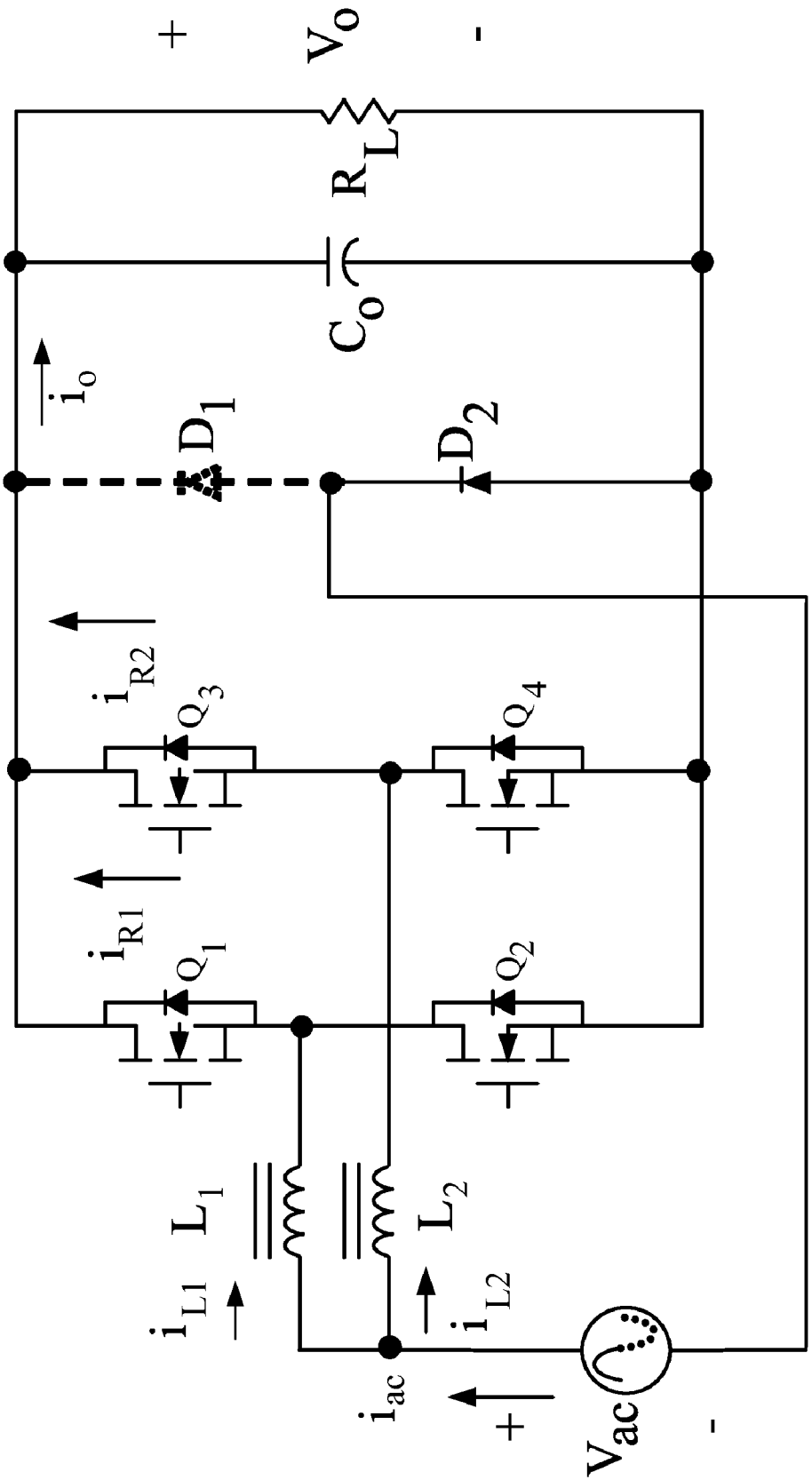
FIG. 7A illustrates an equivalent circuit embodiment of the interleaved bridgeless power factor corrector and the controlling method thereof during the positive half cycle.
Figure 7B:
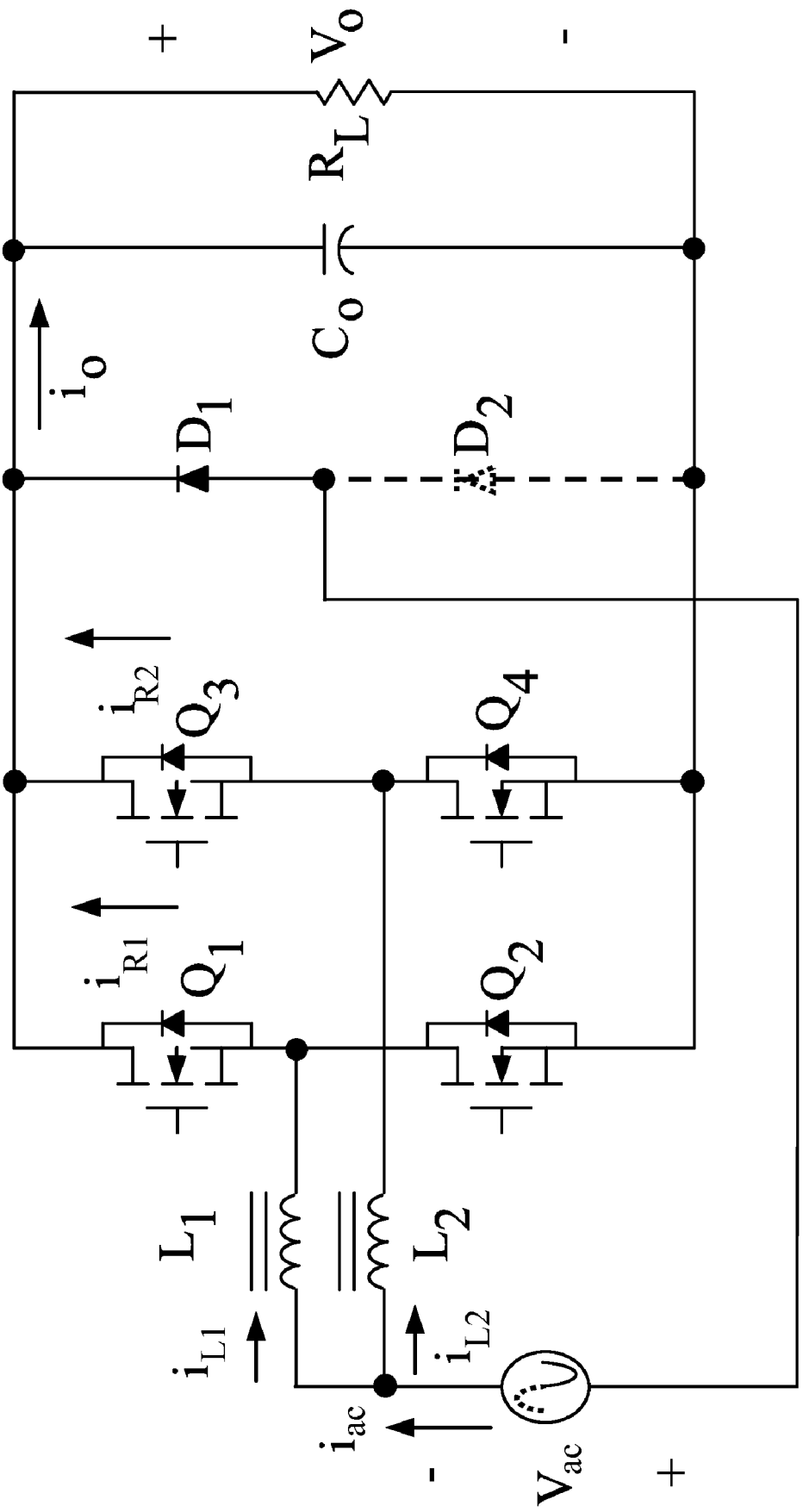
FIG. 7B illustrates an equivalent circuit embodiment of the interleaved bridgeless power factor corrector and the controlling method thereof during the negative half cycle.

The active components $Q_1$~$Q_4$ are active switches and are implemented with suitable semiconductor components based on the power level, the active components $Q_1$~$Q_4$ are turned on or off by the output drive signal of the control circuit 3; the four active components $Q_1$, $Q_2$, $Q_3$, and $Q_4$ act as a set of control switches and a set of rectifying switches having a 180-degree phase delay mutually; in the same set of switches, the active components work as a complementary pair, for example, when the active component $Q_2$ turns on, the active component $Q_1$ cuts off; during a half cycle, the set of control switches is directly controlled by the control circuit, and the set of rectifying switches works as a complementary set to the set of control switches; during a positive half cycle, the active components $Q_2$, $Q_4$ act as the set of control switches, $Q_1$ and $Q_3$ act as the set of rectifying switches;

Therefore, when the input power supply $V_{ac}$ is in a positive half cycle, as shown in FIG. 7A, the active components $D_2$ and $D_1$ are commonly connected with the negative end of the input power supply $V_{ac}$, at this time, if the input current is larger than zero, the input current will make the active component $D_2$ forward biased and flows through the active component $D_2$ and then back to the negative end of the input power supply, meanwhile, the active component $D_1$ is reverse-biased and cut off; similarly, when the input power supply Vac is in a negative half cycle, as shown in FIG. 7B (which shows the circuit when the input power supply $V_{ac}$ is in a negative half cycle, the inductors are now connected to the negative end of the inductor, therefore, the active components $Q_1$, $Q_3$ control the energy storage time of the inductors, and the active components $Q_2$, $Q_4$ act as switches for rectifying path), the active component $D_1$ is forward biased and turns on, while the active component $D_2$ is reverse-biased and cut off, therefore, no matter the input power supply $V_{ac}$ is in a positive half cycle or a negative half cycle, the circuit can be regarded as two sets of boost converters acting as synchronous rectifiers.

Figure 8A:
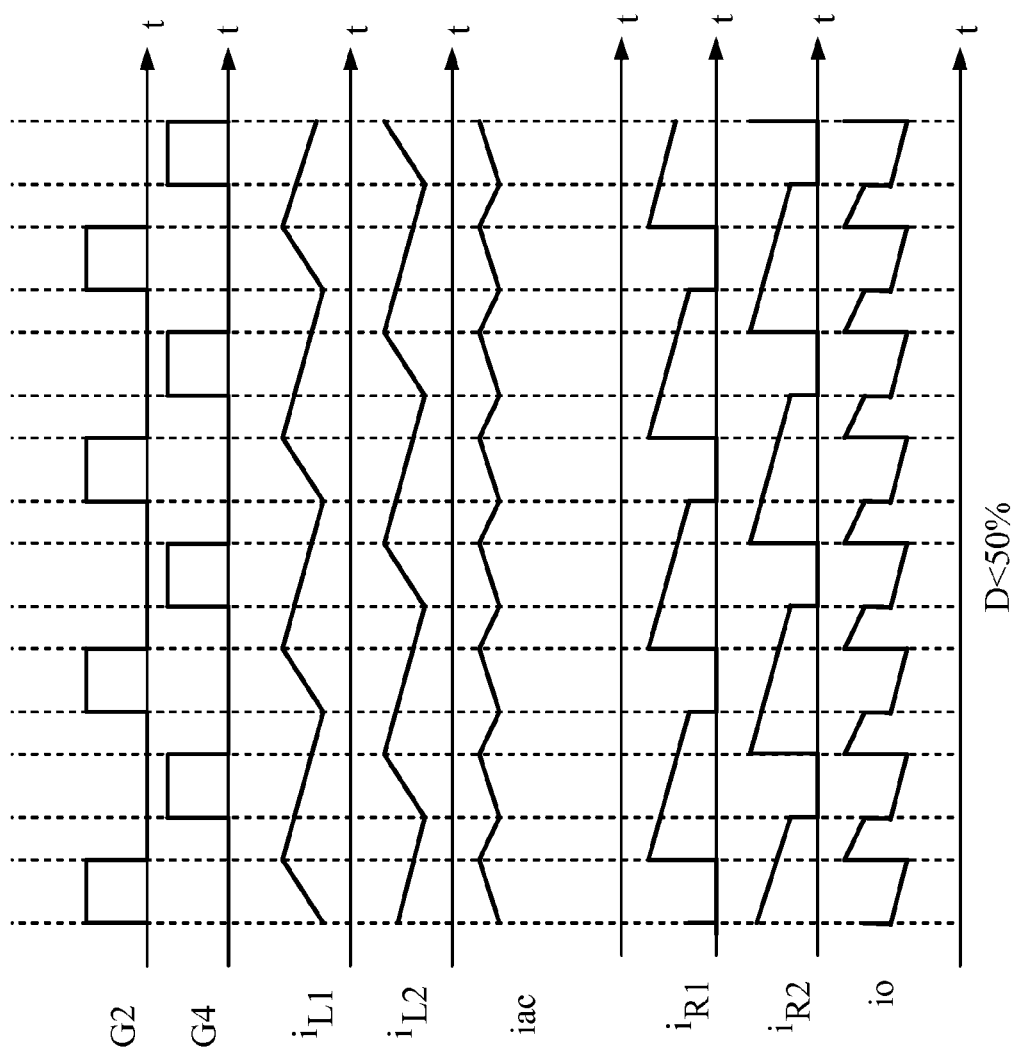
FIG. 8A illustrates a waveform view of the interleaved bridgeless power factor corrector and the controlling method thereof when the positive half cycle D<50%.
Figure 8B:
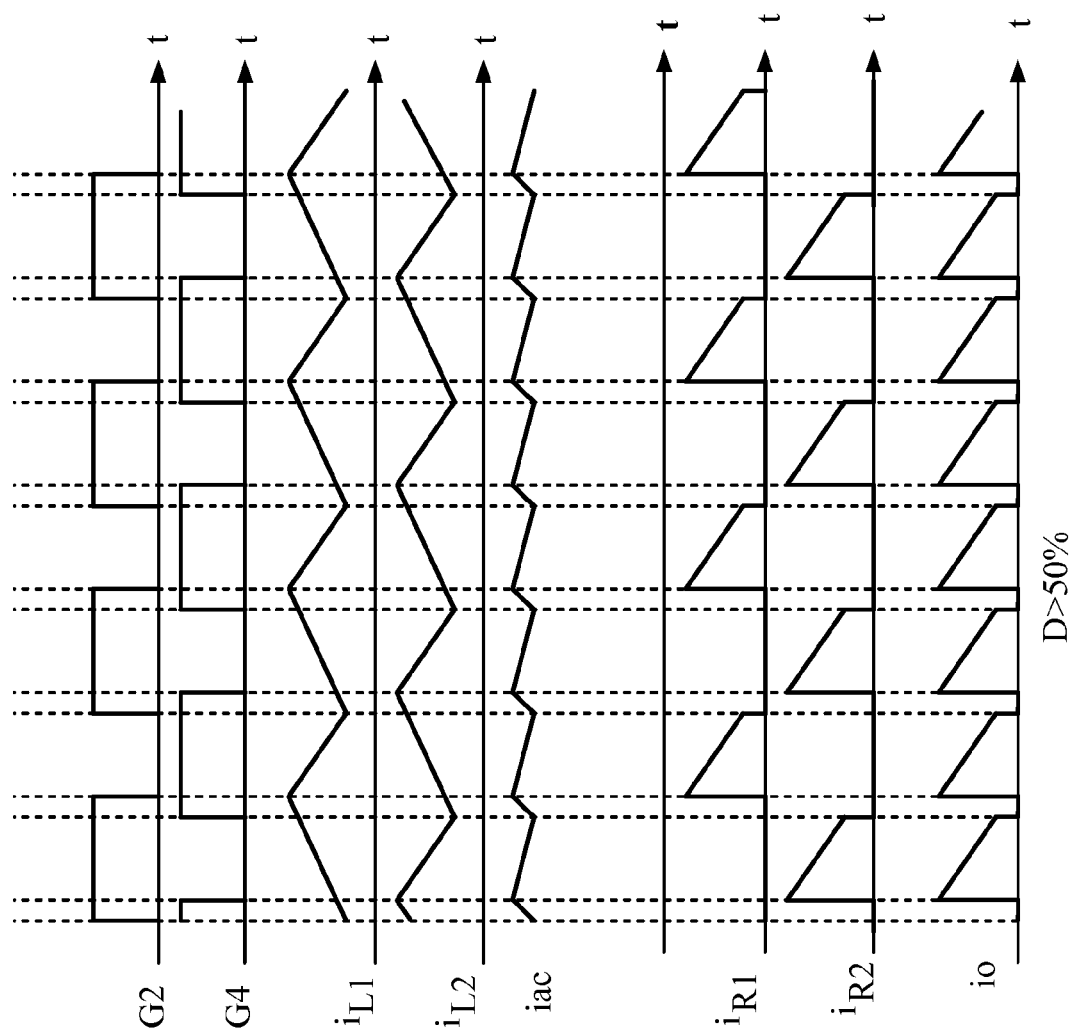
FIG. 8B illustrates a waveform view of the interleaved bridgeless power factor corrector and the controlling method thereof when the positive half cycle D>50%.
Figure 9:
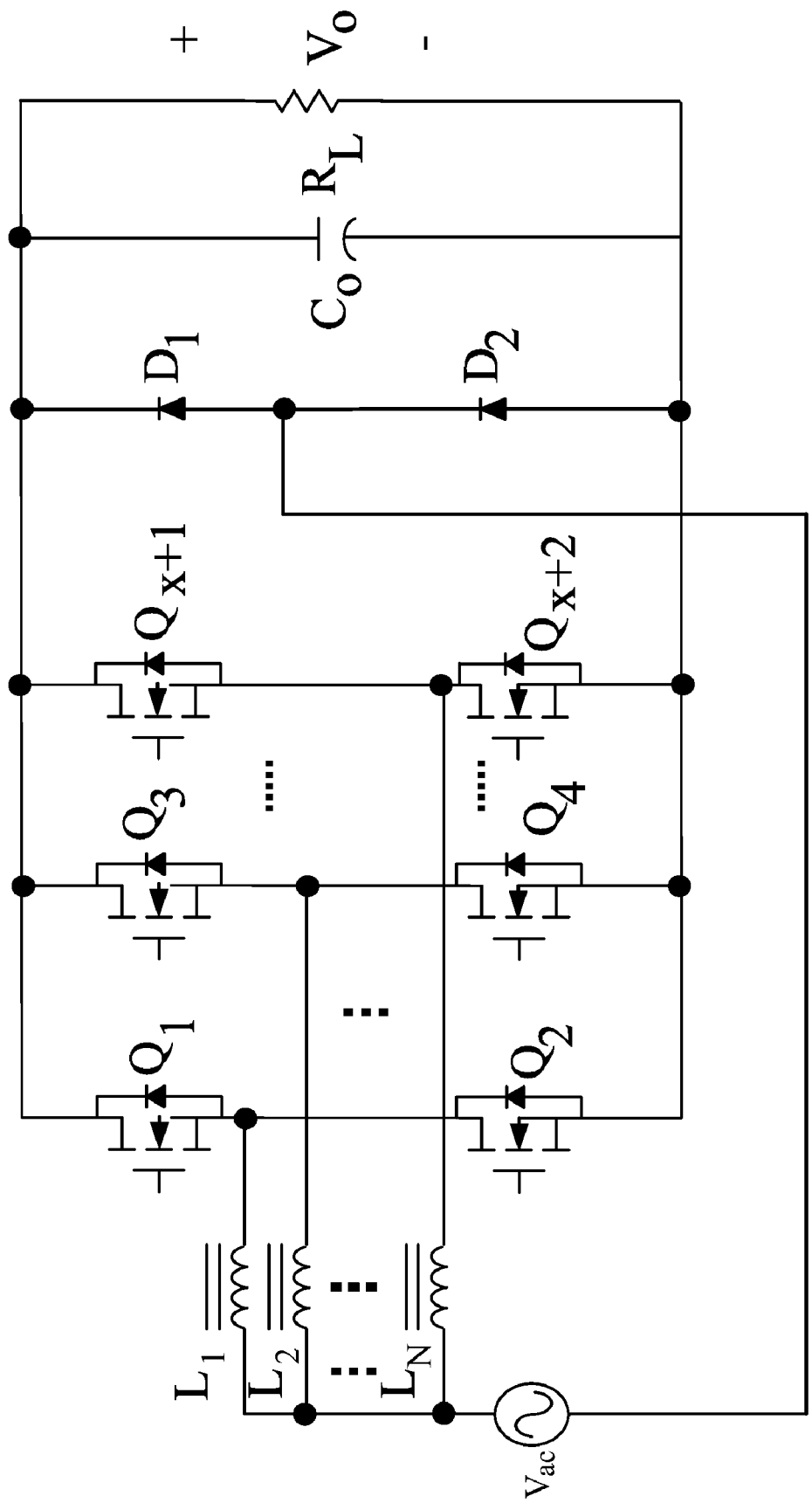
FIG. 9 illustrates an embodiment of a multi-phase interleaved bridgeless power factor corrector of the interleaved bridgeless power factor corrector and the controlling method thereof.

When the input power supply is in a positive half cycle, for better understanding, it is assumed that the switching frequency (>16 KHz) is far more larger than the input power supply frequency (50~60 Hz), which is true in practical applications, therefore, although the input AC power supply is an alternating sinusoidal current source, the input power can be regarded as constant during one cycle, when the active component $Q_2$ turns on, the input power supply charges the inductor $L_1$ through the active components $Q_2$ and $D_2$, at this time, the active component $Q_2$ act as a control switch, which determines the energy storage time of the inductor $L_1$, when the active component $Q_2$ is controlled by the control circuit to be cut off, in order to assure that no short circuit will happen when the active component $Q_1$ turns on and the component $Q_2$ hasn't cut off, so it is required that $Q_1$ is turned on after a certain period of time, which is referred to as dead time, during the dead time, the inductor L1 still provides energy to the circuit, so the diode connected across the active component $Q_1$ is turned on and releases the energy from the inductor $L_1$ to the load, since the diode turns on before the active component $Q_1$ turns on, so the active component $Q_1$ will operate in a zero-voltage conduction state to greatly reduce the switching loss, similarly, the active components $Q_3$, $Q_4$ have the same operation as the active components $Q_1$, $Q_2$, only the phase is delayed by 180 degrees, as shown in FIG. 8A and FIG. 8B, the cancellation effect of current $i_{L1}$, $i_{L2}$ due to the phase delay can obtain less input ripple current and frequency multiplication; meanwhile, the output current can have two states due to the phase delay and the discontinuity of current flowing through the rectifying switch ($Q_1$, $Q_3$), when the duty cycle is less than 50%, the output ripple is reduced by the cancellation effect of the current flowing through the rectifying switches and have its frequency multiplied; when the duty cycle is larger than 50%, the amplitude of the current remains the same, but the frequency is multiplied, therefore, although no cancellation effect is seen for duty cycle >50%, but multiplied frequency still helps the output filter design; furthermore, based on the same principle, this circuit topology can be extended into N phases, as shown in FIG. 9, wherein each signal having a phase delay of 360/N degrees (N equals to the total number of sets of switches).

The present invention discloses an interleaved bridgeless power factor corrector and a controlling method thereof, while compared to other prior art techniques, is advantageous in:

1. The present invention discloses an interleaved bridgeless power factor corrector and a controlling method thereof, which eliminates the use of a front end bridge rectifier to reduce the power loss during power conversion, thereby providing high conversion efficiency.
2. The interleaved bridgeless power factor corrector and the controlling method thereof can achieve the objects of input/output ripple cancellation and frequency multiplication; therefore it is possible to use the input inductor and the output capacitor of smaller sizes to further improve the power density.
3. The interleaved bridgeless power factor corrector and the controlling method thereof can be extended into N-phase application, moreover, the present invention can use common and low cost diodes to achieve the object of low common mode noise without using specific diodes, while the common mode noise is filtered by the input common mode inductors (in a multi-phase application, input inductors are using the same core and connected in a common mode inductor type); furthermore, when the circuit is operated in a high power mode, common mode noises caused by power bounce will not exist since the circuit is always on.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An interleaved bridgeless power factor corrector comprising:
    an AC input power supply having a first end coupled with an input inductor and a second end coupled between a first passive component and a second passive component;
    the input inductor comprising a first input inductor and a second input inductor, wherein the first input inductor has one end coupled between a first active component and a second active component, and the second input inductor is coupled between a third active component and a fourth active component;
    an active component comprising the first active component, the second active component, the third active component, and the fourth active component, wherein the first active component, the second active component, the third active component, and the fourth active component are cascaded in a full-bridge form and are divided into a set of control switches and a set of rectifying switch having different phases, and the set of control switch is directly controlled by a control circuit; and
    a passive component comprising the first passive component and the second passive component, the first passive component having a cathode coupled with an anode of the second passive component, and the mutually connected first passive component and second passive component being connected with the set of control switches, the set of rectifying switches, an output capacitor, and an output resistor in parallel, wherein the first passive component and the second passive component are provided for guiding a flow of a current.

2. The interleaved bridgeless power factor corrector as claimed in claim 1, wherein the set of control switches and the set of rectifying switch having different phases can be connected to n sets of switches, each has a phase delay of 360/(n+2) degrees.

3. The interleaved bridgeless power factor corrector as claimed in claim 1, wherein the interleaved bridgeless power factor corrector can be connected to a control signal processor and the control circuit.

4. The interleaved bridgeless power factor corrector as claimed in claim 3, wherein the control signal processor can output an output control signal to determine a duty cycle of an output drive signal.

5. The interleaved bridgeless power factor corrector as claimed in claim 3, wherein the control circuit is coupled with the interleaved bridgeless power factor corrector and the control signal processor, the control circuit can obtain two sets of control switch drive signals and send them through an XOR circuit to cooperate with a commutating signal to generate a signal, which ensures the commutation of the set of control switches with the set of rectifying switch during a negative half cycle, and finally the control circuit sends the signal through an inverter to obtain a complementary switch signal correspondingly.

6. A controlling method of an interleaved bridgeless power factor corrector, comprising:
    1) outputting an output control signal by a control signal processor to a control circuit for the control circuit to generate two sets of control switch drive signals, the two sets of control switch drive signals being transmitted to an XOR circuit to cooperate with a commutating signal to generate a signal, which ensures the commutation of the set of control switches with the set of rectifying switch during a negative half cycle, and finally the control circuit sends the signal through an inverter to obtain a complementary switch signal correspondingly;
    2) outputting the complementary switch signal by the control circuit to control the interleaved bridgeless power factor corrector, wherein the interleaved bridgeless power factor corrector having four active components ($Q_1$, $Q_2$, $Q_3$, and $Q_4$) acted as a set of control switches and a set of rectifying switches having a 180-degree phase delay mutually; in the same set of switches, the active components work as a complementary pair, that is, when the active component ($Q_2$) turns on, the active component ($Q_1$) cuts off; during a half cycle, the set of control switches is directly controlled by the control circuit, and the set of rectifying switches works as a complementary set to the set of control switches; during a positive half cycle, the active components ($Q_2$, $Q_4$) act as the set of control switches, ($Q_1$ and $Q_3$) act as the set of rectifying switches; and
    during a negative half cycle, ($Q_1$, $Q_3$) acting as the set of control switches and ($Q_2$, $Q_4$) acting as the set of rectifying switches to generate a phase delay of 180 degrees, wherein a waveform of a current flowing through an inductor is cancelled due to the phase delay; therefore a smaller ripple current is obtained, and a frequency multiplication of the current is achieved.

* * * * *